(12) United States Patent
Ouyang et al.

(10) Patent No.: US 11,204,541 B2
(45) Date of Patent: Dec. 21, 2021

(54) WAVELENGTH-CONVERTING MODULE, LIGHT SOURCE DEVICE, AND PROJECTION APPARATUS

(71) Applicant: Coretronic Corporation, Hsin-Chu (TW)

(72) Inventors: Jhen Ouyang, Hsin-Chu (TW); Wen-Ching Ho, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/882,566

(22) Filed: May 25, 2020

(65) Prior Publication Data
US 2020/0379332 A1 Dec. 3, 2020

(30) Foreign Application Priority Data
May 27, 2019 (CN) .......................... 201910444444.7

(51) Int. Cl.
| | | |
|---|---|---|
| G03B 21/14 | (2006.01) | |
| G03B 21/20 | (2006.01) | |
| G03B 21/16 | (2006.01) | |
| G02B 26/00 | (2006.01) | |

(52) U.S. Cl.
CPC ....... *G03B 21/2033* (2013.01); *G02B 26/008* (2013.01); *G03B 21/16* (2013.01)

(58) Field of Classification Search
CPC .... G03B 21/14; G03B 21/2033; G03B 21/16; G03B 21/005; G03B 21/006; G03B 21/008; G02B 26/008; G02B 26/007; H04N 9/31; H04N 9/3111
See application file for complete search history.

(56) References Cited

U.S. PATENT DOCUMENTS

| | | | |
|---|---|---|---|
| 7,367,680 B2 * | 5/2008 | Goo ........................ | G03B 21/14 353/84 |
| 10,168,605 B2 * | 1/2019 | Egawa ............... | G03B 21/2066 |
| 10,203,589 B2 * | 2/2019 | Takagi ................... | G03B 21/16 |

(Continued)

FOREIGN PATENT DOCUMENTS

| | | |
|---|---|---|
| CN | 2909522 Y | 6/2007 |
| CN | 104661005 A | 5/2015 |

(Continued)

*Primary Examiner* — William C. Dowling

(57) ABSTRACT

A projection apparatus includes a light valve, a projection lens, and a light source device. The light source device provides an illumination beam and includes a casing, a light source, and a wavelength-converting module. The casing has an opening portion. The light source device is disposed in the casing and provides an excitation beam. The wavelength-converting module is disposed at the opening portion and includes a bracket, a motor, and a wavelength-converting wheel. Heat-dissipating fin set of the bracket is exposed out of the casing via the opening portion. The motor is disposed on a carrying portion of the bracket. The wavelength-converting wheel is driven to rotate by the motor. The wavelength-converting wheel converts the excitation beam into a conversion beam. The illumination beam includes the conversion beam. The light valve is disposed on a transmissive path of the illumination beam to convert the illumination beam into an image beam.

11 Claims, 8 Drawing Sheets

(56) References Cited

U.S. PATENT DOCUMENTS

| | | | |
|---|---|---|---|
| 10,401,719 B2* | 9/2019 | Noda | G02B 26/008 |
| 10,585,341 B2* | 3/2020 | Kikuchi | G02B 26/008 |
| 2019/0011817 A1* | 1/2019 | Kobayashi | F21V 9/30 |
| 2020/0371415 A1* | 11/2020 | Arai | G02B 26/008 |

FOREIGN PATENT DOCUMENTS

| | | |
|---|---|---|
| CN | 106597783 A | 4/2017 |
| CN | 207704179 U | 8/2018 |
| CN | 208351125 U | 1/2019 |
| CN | 209803545 U | 12/2019 |
| JP | 2000047601 A | 2/2000 |
| TW | 201820018 A | 6/2018 |
| WO | 2017076337 A1 | 5/2017 |

* cited by examiner

WAVELENGTH-CONVERTING MODULE, LIGHT SOURCE DEVICE, AND PROJECTION APPARATUS

CROSS-REFERENCE TO RELATED APPLICATION

This application claims the priority benefit of China application CN201910444444.7 filed on 2019 May 27. The entirety of the above-mentioned patent application is hereby incorporated by reference herein and made a part of this specification.

FIELD OF THE INVENTION

The invention relates to a wavelength-converting module, a light source device, and a projection apparatus, and more particularly to a wavelength-converting module, a light source device, and a projection apparatus which have good heat-dissipating efficiency.

BACKGROUND OF THE INVENTION

Laser projectors usually use a blue laser as a light source. In order to produce lights having different colors, a phosphor color wheel is required for color conversion. When the blue laser light is emitted and radiates on the phosphor color wheel, the phosphor powder on the color wheel is excited by the blue light to generate lights having different wavelength bands, that is, lights having different colors. Since the excitation conversion efficiency of the phosphor powder is not 100%, part of the energy of the blue light is converted into heat and causes a raise in the temperature of the phosphor wheel. When the phosphor wheel is affected by the energy of the blue light and a high temperature is generated, components around it, such as a motor and a light sensor, are also affected. When the motor temperature exceeds the temperature specification, the life of the projection apparatus will be reduced. When the light sensor temperature exceeds the temperature specification, the projection apparatus will suddenly shut down during operation.

In order to avoid the situation mentioned above, conventionally, heat-dissipating fins are added to the casing of the light source device where the phosphor color wheel is located or a fan is installed in the casing to reduce the temperature of the phosphor color wheel, the motor, and the light sensor.

However, when the heat is dissipated by the heat-dissipating fins on the casing, the heat transfer is not good because the heat is transmitted by the color wheel (the heat wheel reaches the heat dissipating fins through the color wheel bracket and the casing). Moreover, if it is necessary to reduce the volume of the casing, the volume and number of the heat-dissipating fins also have to be reduced correspondingly and thereby going against the heat dissipation. In addition, when the fan is used for heat dissipation, the casing must have a considerable volume to accommodate the fan, which is disadvantageous for miniaturization of the light source device and the projection apparatus.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength-converting module which has good heat-dissipating performance and facilitates the miniaturization of light source devices and projection apparatuses.

The invention provides a light source device which has good heat-dissipating performance and facilitates the miniaturization of projection apparatuses.

The invention provides a projection apparatus which has good heat-dissipating performance and meets the requirements of miniaturization.

Other advantages and objects of the invention may be further illustrated by the technical features broadly embodied and described as follows.

In order to achieve one or a portion of or all of the objects or other objects, an embodiment of the invention provides a wavelength-converting module which includes a bracket, a motor, and a wavelength-converting wheel. The bracket includes a carrying portion and a heat-dissipating fin set. The heat-dissipating fin set is connected with the carrying portion. The motor is mounted to the carrying portion, and the wavelength-converting wheel is driven to rotate by the motor.

In order to achieve one or a portion of or all of the objects or other objects, an embodiment of the invention provides a light source device which includes a casing, a light source, and a wavelength-converting module mentioned above. The casing has an opening portion. The light source is disposed in the casing and is configured to provide an excitation beam. The wavelength-converting module is disposed at the opening portion. The heat-dissipating fin set is exposed out of the casing via the opening portion, and the wavelength-converting wheel is disposed on a transmissive path of the excitation beam.

In order to achieve one or a portion of or all of the objects or other objects, an embodiment of the invention provides a projection apparatus includes a light valve, a projection lens, and a light source device mentioned above. The light source device is configured to provide an illumination beam. The light valve is disposed on a transmissive path of the illumination beam to convert the illumination beam into an image beam. The projection lens is disposed on a transmissive path of the image beam. The wavelength-converting wheel converts the excitation beam into a conversion beam. The illumination beam includes the conversion beam.

In the wavelength-converting module, the light source device, and the projection apparatus of the invention, the motor, the wavelength-converting wheel, and the light sensor are mounted to the carrying portion of the bracket, the bracket has the heat-dissipating fin set connected with the carrying portion, and the heat-dissipating fin set is exposed out of the casing via the opening portion, the heat generated by the motor and the wavelength-converting wheel while working can be can be directly conducted to the heat-dissipating fins via the carrying portion and further dissipated by the air outside of the casing, so as to effectively reduce the temperature of the motor, the wavelength-converting wheel, and the bracket, and thereby achieving the effect of avoiding the thermal damage of the motor and the wavelength-converting wheel, and maintaining normal operation of the light source device. In addition, since the heat dissipation of the motor, the wavelength-converting wheel, and so on may be achieved by heat-dissipating fin set exposed out of the casing, the use of additional heat-dissipating elements may be omitted. The volume of the casing may be further reduced to facilitate the miniaturization of the light source device and the projection apparatus.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
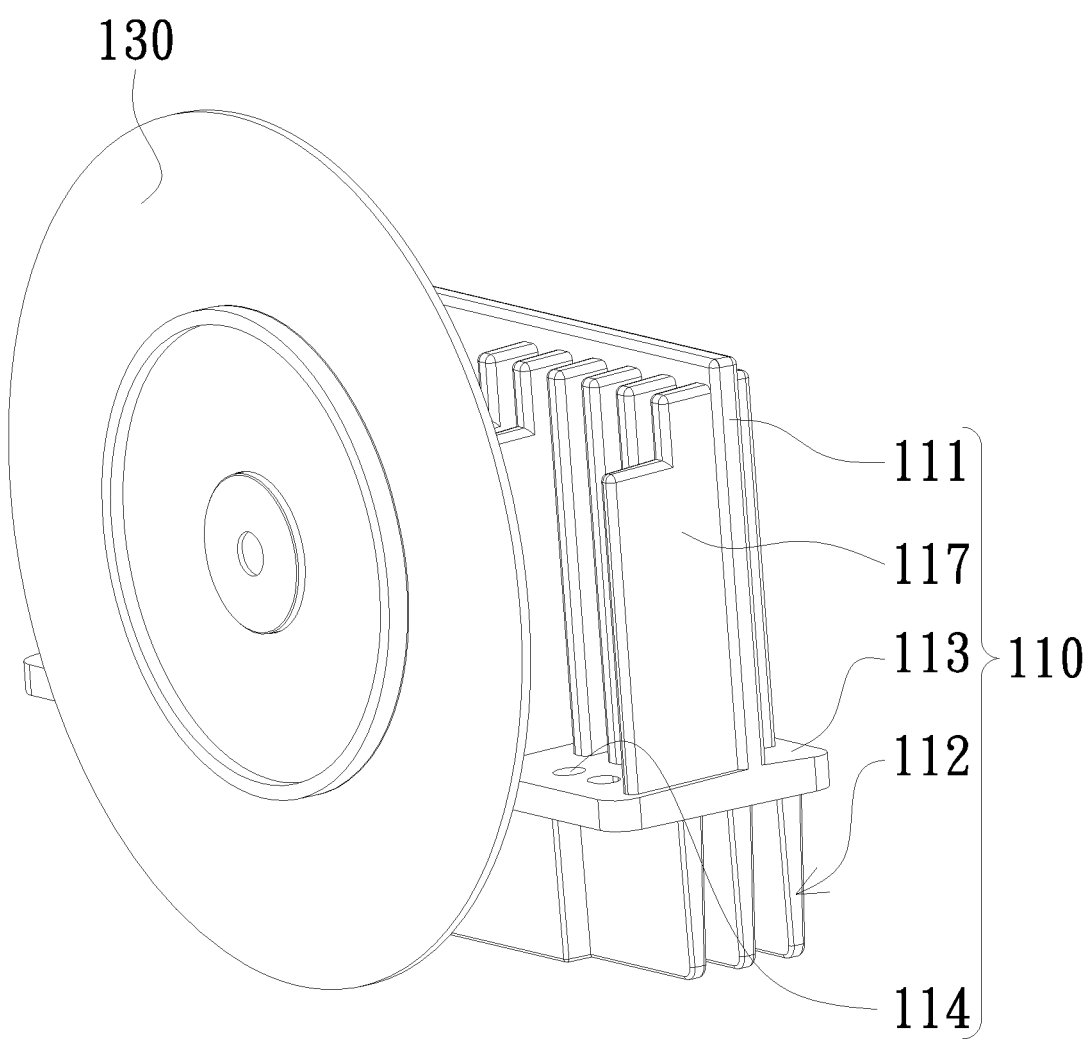
FIG. 1 is a schematic appearance of a wavelength-converting module according to an embodiment of the invention.
Figure 1:
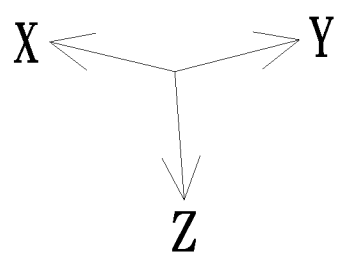
Figure 2:
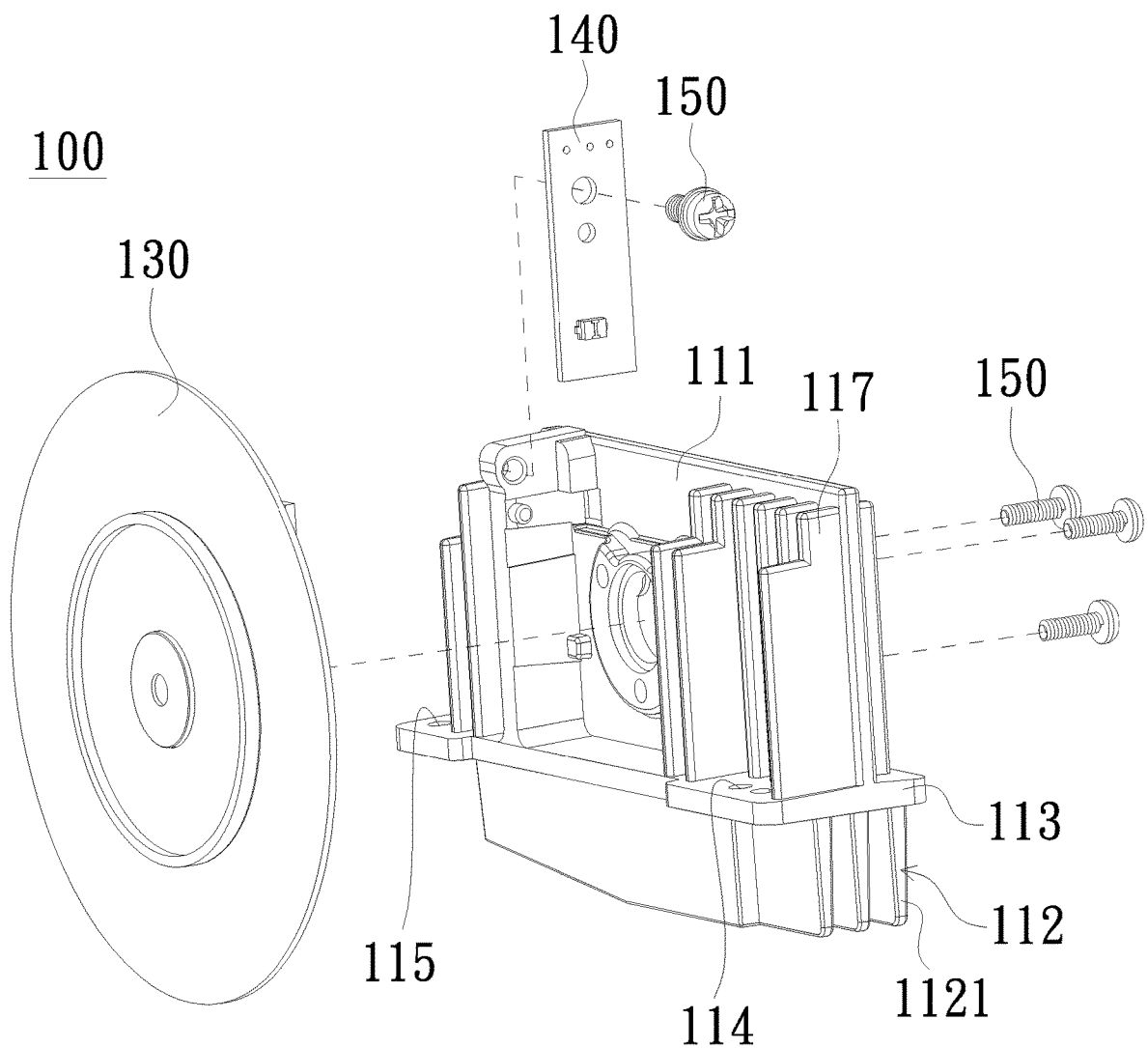
FIG. 2 is a schematic exploded view of the wavelength-converting module in FIG. 1.
Figure 3:
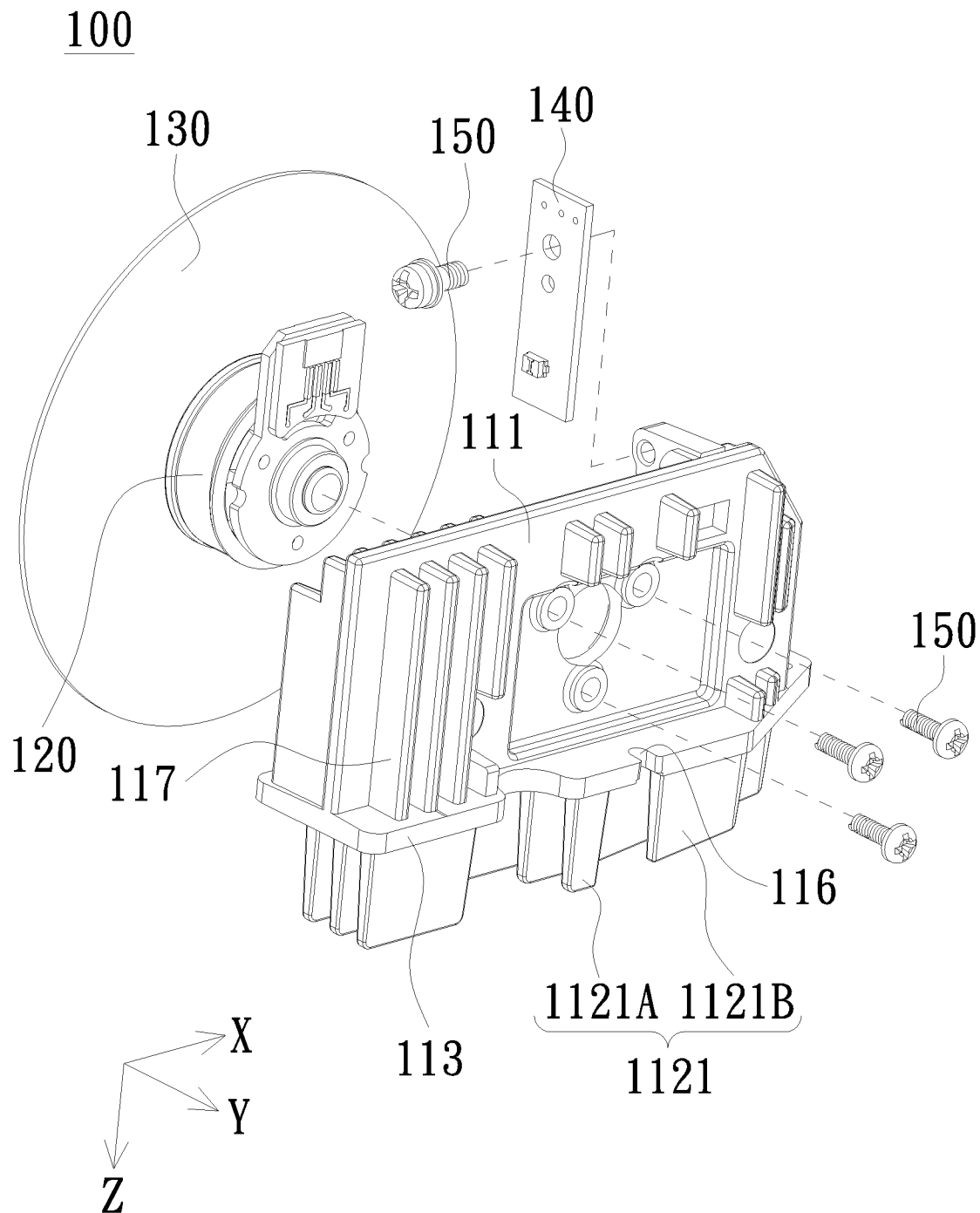
FIG. 3 is another schematic exploded view of the wavelength-converting module in FIG. 1.
Figure 4:
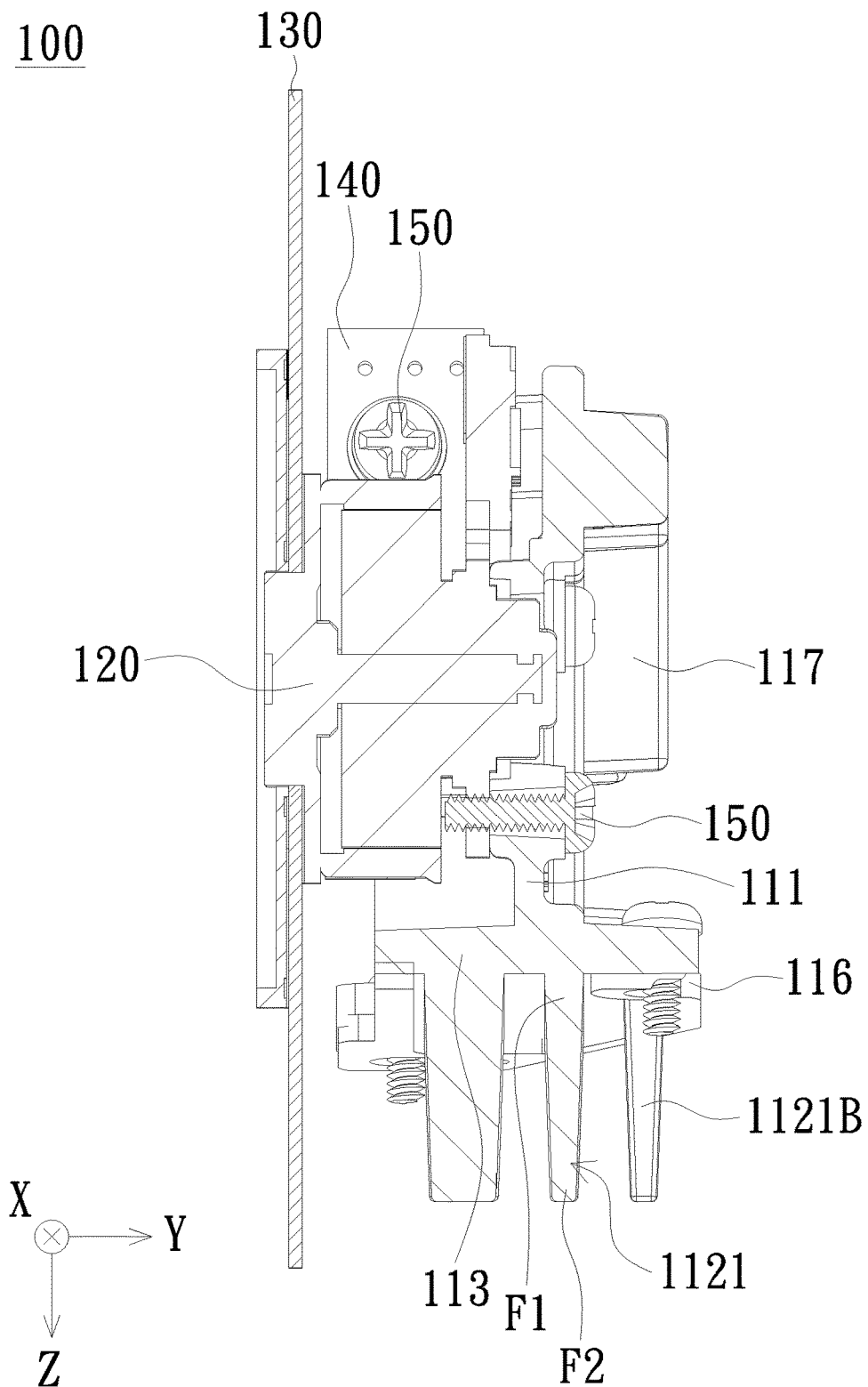
FIG. 4 is a schematic sectional view of the wavelength-converting module in FIG. 1.

FIG. 1 is a schematic appearance of a wavelength-converting module according to an embodiment of the invention. FIG. 2 is a schematic exploded view of the wavelength-converting module in FIG. 1. FIG. 3 is another schematic exploded view of the wavelength-converting module in FIG. 1. FIG. 4 is a schematic sectional view of the wavelength-converting module in FIG. 1. Referring to FIGS. 1 to 4, the wavelength-converting module 100 of the embodiment includes a bracket 110, a motor 120, and a wavelength-converting wheel 130. The bracket 110 includes a carrying portion 111 and a heat-dissipating fin set 112. The heat-dissipating fin set 112 is connected with the carrying portion 111. The motor 120 is mounted to the carrying portion 111, and the wavelength-converting wheel 130 is driven by the motor 120 to rotate. In the embodiment, the motor 120 and the wavelength-converting wheel 130 may be disposed at a front side of the carrying portion 111, and the motor 120 is positioned between the wavelength-converting wheel 130 and the carrying portion 111, but the dispositions of the motor 120 and the wavelength-converting wheel 130 on the carrying portion 111 are not limited in the invention. In addition, the material of the bracket 110, may be, preferably, for example, copper, magnesium, iron or alloys including copper, magnesium, or iron, but the invention is not limited thereto. Further, the wavelength-converting module 100 may further include a light sensor 140. The light sensor 140 is disposed on the carrying portion 111 for sensing the rotation position of the wavelength-converting wheel 130. In the embodiment, the light sensor 140 is disposed at the front side of the carrying portion 111, the motor 120 and the light sensor 140 may be fixed on the carrying portion 111 by locking elements 150 such as screws, but the invention does not limit the installation manner of the motor 120 and the light sensor 140 on the carrying portion 111.

The bracket 110 described-above may further include a connecting portion 113 and a locking hole 114, 115, 116. Two opposite side faces of the connecting portion 113 are connected with the carrying portion 111 and the heat-dissipating fin set 112 respectively. The locking hole 114, 115, 116 are formed on the connecting portion 113. In the embodiment, the locking hole 114, 115, 116 are formed on the connecting portion 113 in a manner of penetrating through a top side and a bottom side of the connecting portion 113. The carrying portion 111 and the heat-dissipating fin set 112 may be disposed at the top side and the bottom side of the connecting portion 113 respectively. For example, the carrying portion 111 extends from the top side of the connecting portion 113 toward a direction away from the connecting portion 113, the heat-dissipating fin set 112 extends from the bottom side of the connecting portion 113 toward a direction away from the connecting portion 113, and the extension directions of the carrying portion 111 and the heat-dissipation fin set 112 are opposite, but the invention is not limited thereto. In addition, the number of the locking hole 114, 115, 116 may be one or more. The embodiment is exemplified by three locking holes 114, 115, 116, but the invention does not limit the number of the locking hole 114, 115, 116.

The heat-dissipating fin set 112 described-above may include a heat-dissipating fin 1121. The heat-dissipating fin 1121 is connected with the connecting portion 113, and the number of the heat-dissipating fin 1121 may be one or more. In the embodiment, the number of the heat-dissipating fin 1121 in the heat-dissipating fin set 112 is more than one. The heat-dissipating fins 1121 of the heat-dissipating fin set 112 extend from the bottom side of the connecting portion 113 toward the direction away from the connecting portion 113 and are parallel to each other. Regarding the arrangement manner of the heat-dissipating fins 1121, for example, the heat-dissipating fins 1121 may be sequentially arranged on the connecting portion 113 along a first direction X or a second direction Y. The first direction X and the second direction Y intersect with the extension direction Z of the heat-dissipating fins 1121, and the extension direction Z of the heat-dissipating fins 1121 is vertical to the first direction X and the second direction Y. In the embodiment, the heat-dissipating fins 1121 are sequentially arranged on the connecting portion 113, and the first direction X, the second direction Y, and the extension direction Z of the heat-dissipation fins 1121 are vertical with each other, but the invention does not limit the arrangement manner of the heat-dissipating fins 1121.

In addition, in the embodiment, the heat-dissipating fin 1121 are connected with the carrying portion 111 via the connecting portion 113, the thicknesses of the heat-dissipating fins 1121 decrease from the connecting portion 113 (carrying portion 111) toward the direction away from the connecting portion 113 (carrying portion 111). In other words, the heat-dissipating fins 1121 have opposite fixed ends F1 and free ends F2. The fixed ends F1 of the heat-dissipating fins 1121 are connected with the connecting portion 113 (carrying portion 111), the thicknesses of the fixed ends F1 of the heat-dissipating fins 1121 are larger than the thicknesses of the free ends F2 of the heat-dissipating fins 1121, and therefore, the heat-dissipating fins 1121 are wedge-shaped in sectional side views. By means of the design that the thicknesses of the heat-dissipating fins 1121 decrease from the connecting portion 113 (carrying portion 111) toward the direction away from the connecting portion 113 (carrying portion 111), the cross-sectional area of the fixed ends F1 of the heat-dissipating fins 1121 is increased, meaning the connection area of the fixed ends F1 of the heat-dissipating fins 1121 and the connecting portion 113 (carrying portion 111) is larger. In this way, the heat generated while the motor 120 drives the wavelength-converting wheel 130 to rotate, the heat generated while the excitation beam irradiates on the wavelength-converting wheel 130, and the heat generated while the light sensor 140 is in operation can be efficiently conducted to the heat-dissipating fins 1121 via the carrying portion 111 and the connecting portion 113 to be rapidly dissipated.

Further, in the embodiment, one of the locking holes 116 penetrates through one of the heat-dissipating fins 1121 along the extension direction Z of the heat-dissipating fin 112, so as to divide the heat-dissipating fin 112 into two. In other words, one of the heat-dissipating fins 1121 is consisted of a first heat-dissipating fin 1121A and a second heat-dissipating fin 1121B. One of the locking holes 116 is disposed between the first heat-dissipating fin 1121A and the second heat-dissipating fin 1121B, so that the first heat-dissipating fin 1121A and the second heat-dissipating fin 1121B are spaced apart. Accordingly, the surface area of the heat-dissipating fin 1121 is increased and thereby enhancing heat-dissipating effect.

The bracket 110 may further include a heat-dissipating protruding rib 117. The heat-dissipating protruding rib 117 is disposed on the carrying portion 111. The number of the heat-dissipating protruding rib 117 may be one or more. In the embodiment, the number of the heat-dissipating protruding rib 117 is more than one, and the heat-dissipating protruding ribs 117 are disposed at the front side and the back side of the carrying portion 111. However, in other embodiments, the heat-dissipating protruding ribs 117 may be merely disposed at the front side or the back side of the carrying portion 111. By means of the disposition of the heat-dissipating protruding ribs 177, the heat-dissipating performance of the carrying portion 111 is improved and the heat accumulation on the carrying portion 111 is decreased.

The wavelength-converting module 100 of the embodiment may be applied to a light source device of a projection apparatus. Since the bracket 110 of the wavelength-converting module 100 of the embodiment has the heat-dissipating fin set 112 connected with the carrying portion 111, the heat generated by the motor 120 mounted to the carrying portion while driving the wavelength-converting wheel 130 to rotate, the heat generated while the excitation beam irradiates on the wavelength-converting wheel 130 for wavelength conversion, and the heat generated while the light sensor 140 is in operation can be directly conducted to the heat-dissipating fins 1121 via the carrying portion 111 (the impedance of heat transfer is small) and effectively dissipated, so as to avoid the thermal damage of the motor 120, the wavelength-converting wheel 13 and the light sensor 140 and maintain normal operation of the projection apparatus.

Figure 5:
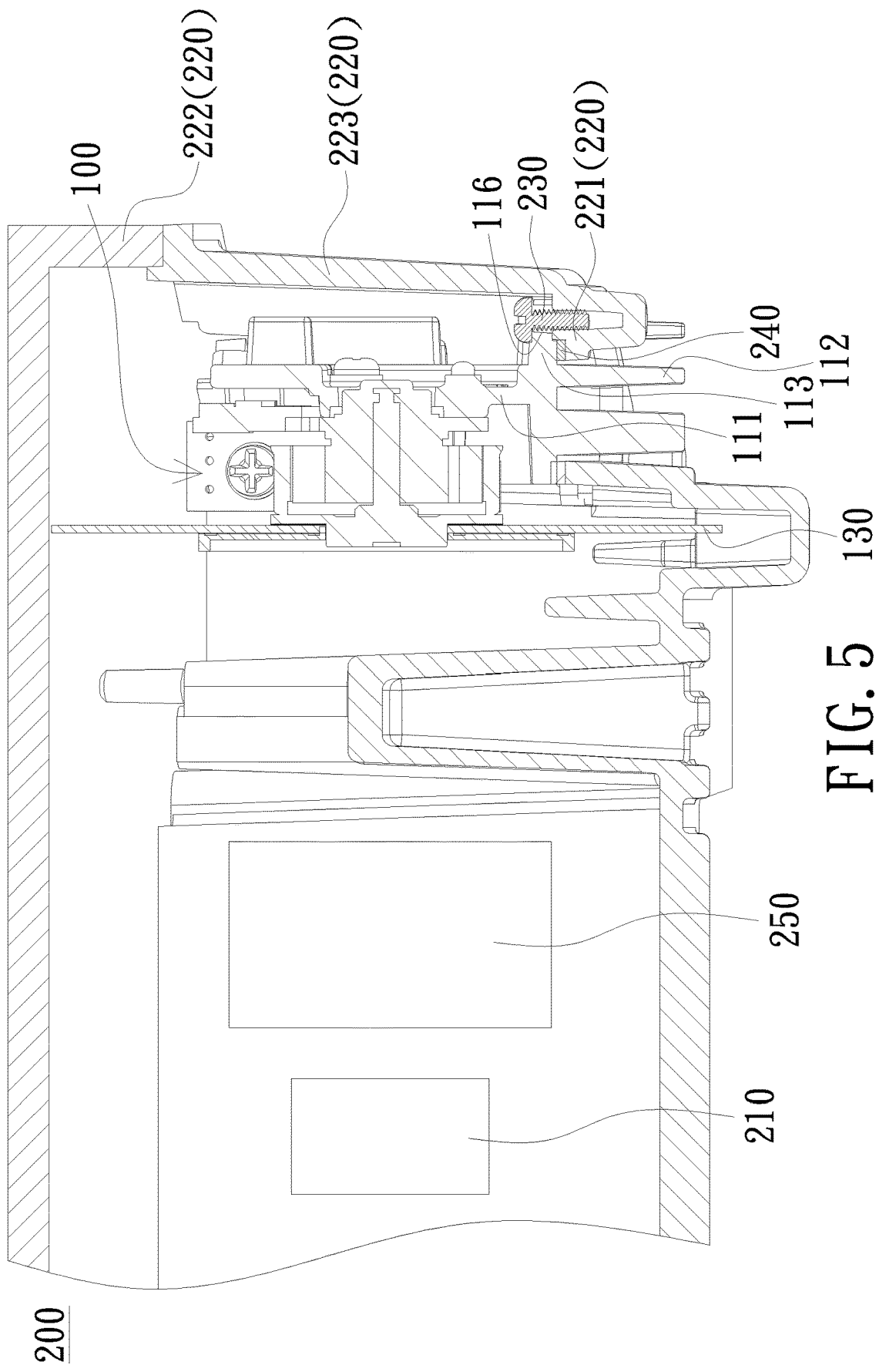
FIG. 5 is a schematic sectional view of a light source device according to an embodiment of the invention.
Figure 6:
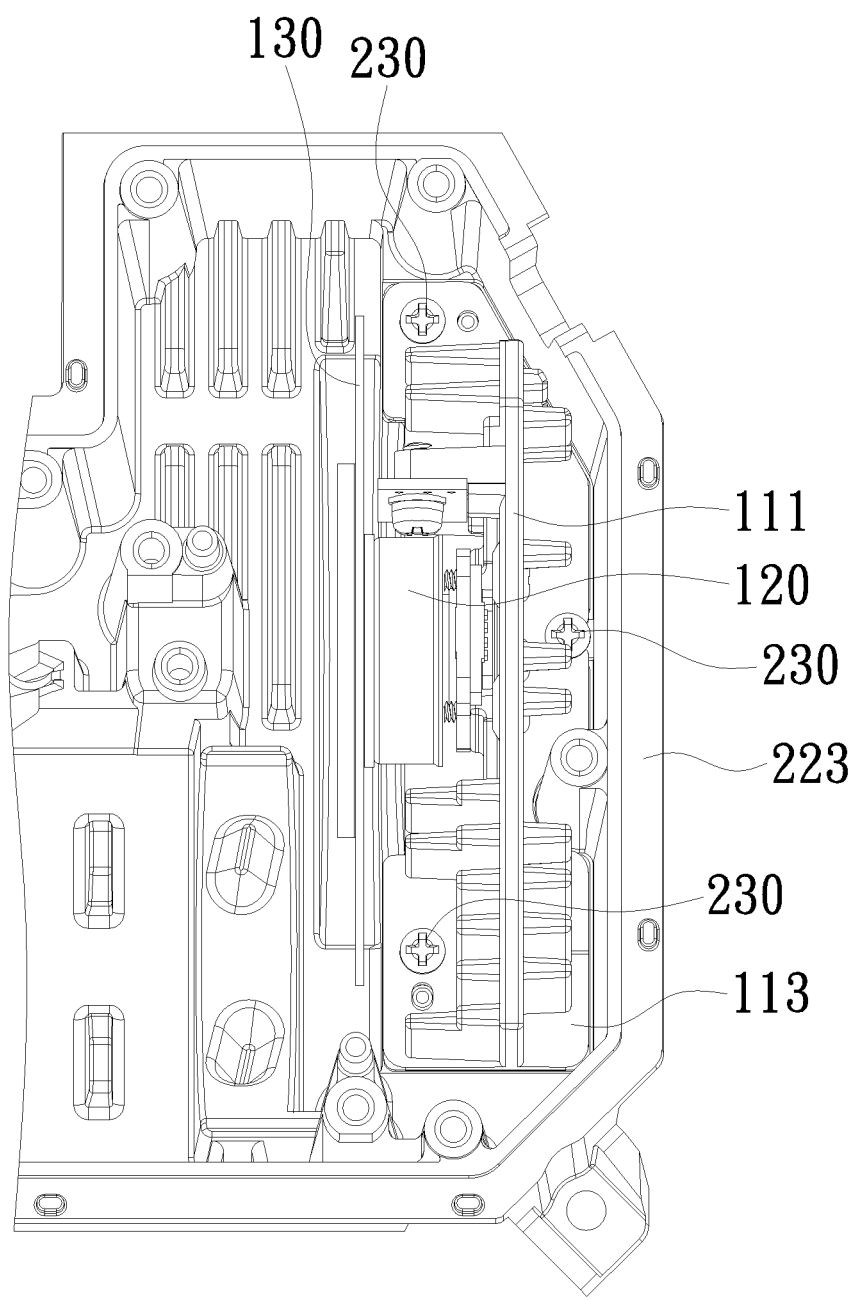
FIG. 6 is a schematic top view of a light source device according to an embodiment of the invention, in which a top cover of a casing is omitted.
Figure 7:
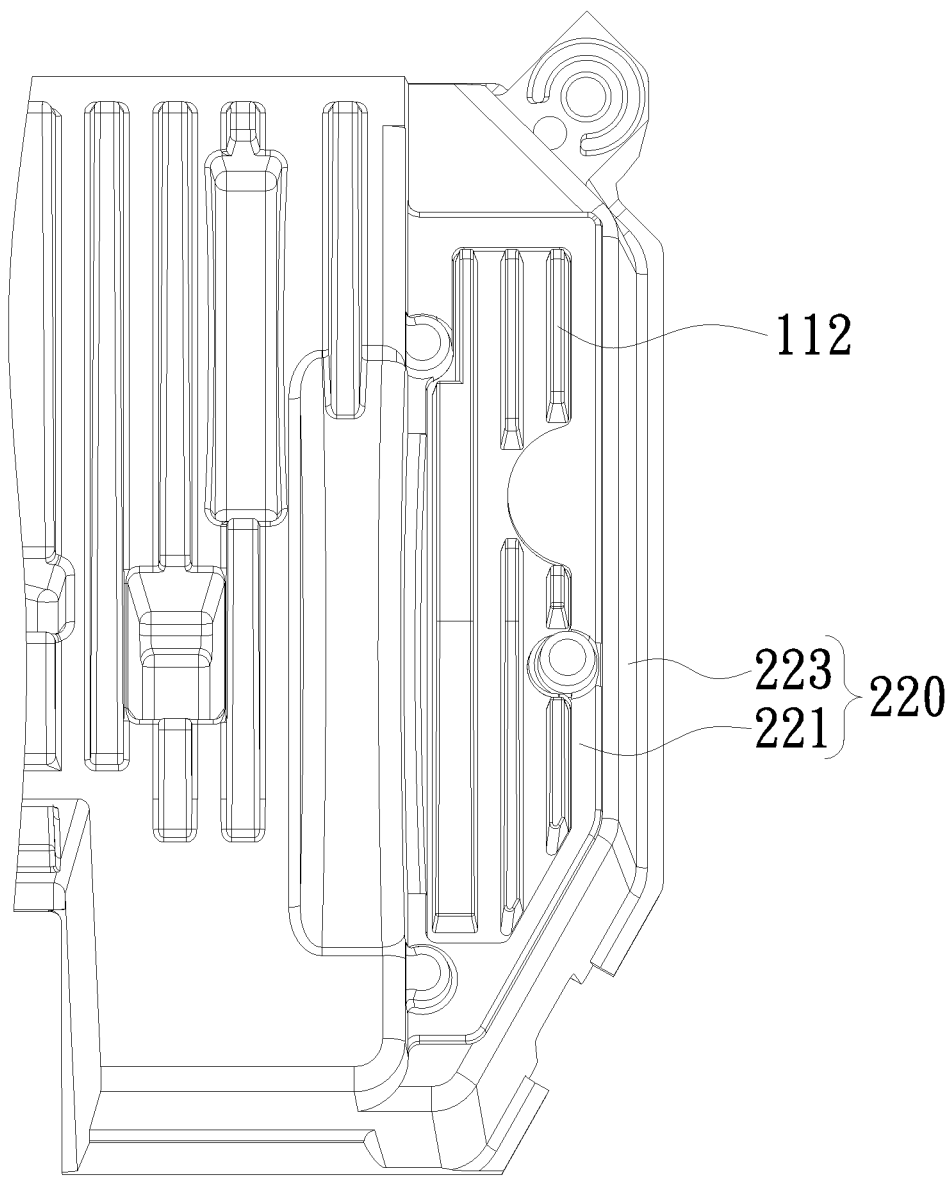
FIG. 7 is a schematic bottom view of a light source device according to an embodiment of the invention.

FIG. 5 is a schematic sectional view of a light source device according to an embodiment of the invention. FIG. 6 is a schematic top view of a light source device according to an embodiment of the invention, in which a top cover of a casing is omitted. FIG. 7 is a schematic bottom view of a light source device according to an embodiment of the invention. Referring to FIGS. 1, 4 to 7, the wavelength-converting module 100 described-above may be disposed in the casing 220 together with the light source 210 to constitute the light source device 200 of the embodiment. In other words, the light source device 200 of the embodiment includes the casing 220, the light source 210, and the wavelength-converting module 100 described-above. The casing 220 has an opening portion 221. The light source 210 is disposed in the casing 220 and is configured to provide an excitation beam. The wavelength-converting module 100 is disposed at the opening portion. The carrying portion 111 is positioned on the casing 220. The connecting portion 113 abuts against the opening portion 221, and the heat-dissipating fin set 112 is exposed out of the casing 220 via the opening portion 221. The wavelength-converting wheel 130 is disposed on a transmissive path of the excitation beam. In addition, the bracket 110 may be locked on the opening portion 221 by locking elements 230 simultaneously mounted through the locking holes 114, 115, 116 and the opening portion 221. In the embodiment, the locking holes 114, 115, 116 formed on the connecting portion 113 may be arranged as an isosceles triangle to enhance the locking strength between the bracket 110 and the casing 220, and decrease the relative vibration between the bracket 110 and the casing 220. Further, in the embodiment, the casing 220 may include a top cover 222 and a bottom cover 223. The opening portion 221 is formed on the bottom cover 223, and the wavelength-converting wheel 130 and the motor 120 are wrapped between the top cover 222 and the bottom cover 223. The material of the casing 220 may be, for example, magnesium, copper, iron, or alloys containing magnesium, copper, or iron, but the invention is not limited thereto.

The light source device 200 described above may further include a filing element 240. The filing element 240 is disposed in the casing 220 and is positioned between the connecting portion 113 and the opening portion 221. The material of the filing element 240 may be, for example, sponge, rubber, and so on. The filing element 240 may block the external dust from entering the casing 220 through the gap between the connecting portion 113 and the opening portion 221, and absorb the vibration of bracket 110 or/and casing 220 caused by the rotation of the wavelength-converting wheel 130.

The light source 210 may be, for example, a diode module including a light emitting diode or a laser diode (LD), or a diode array including a plurality of diode modules, but the invention is not limited thereto. And the light source device 200 may further include a light combining element 250. The light combining element 250 is disposed between the light source 210 and the wavelength-converting wheel 130 to transmit the excitation beam to the wavelength-converting wheel 130.

In the light source device 200, the motor 120, the wavelength-converting wheel 130, and the light sensor 140 are mounted to the carrying portion 111 of the bracket 110 and the bracket 110 has the heat-dissipating fin set 112 connected with the carrying portion 111, so the heat generated by the motor 120 while driving the wavelength-converting wheel 130 to rotate, the heat generated while the excitation beam irradiates on the wavelength-converting wheel 130 for wavelength conversion, and the heat generated while the light sensor 140 is in operation can be directly conducted to the heat-dissipating fins 1121 via the carrying portion 111 and dissipated from the heat-dissipating fins 1121. Particularly, since the heat-dissipating fin set 112 is exposed out of the casing 220 via the opening portion 221, and there is a temperature difference between the heat-dissipating fin set 112 and the air outside of the casing 220, the heat transmitted to the heat-dissipating fin set 112 may be further dissipated by the air outside of the casing 220, so as to effectively reduce the temperature of the motor 120, the wavelength-converting wheel 130, the light sensor 140, and the bracket, and thereby achieving the effect of avoiding the thermal damage of the motor 120, the wavelength-converting wheel 130, the light sensor 140 and maintaining normal operation of the light source device 200. In addition, since the heat dissipation of the motor 120, the wavelength-converting wheel 130, the light sensor 140, and so on may be achieved by heat-dissipating fins 1121 exposed out of the casing 220, the use of additional heat-dissipating elements such as fans may be omitted. The volume of the casing 220 may be further reduced to facilitate the miniaturization of the light source device 200 and a projection apparatus to which the light source device 200 is applied.

Figure 8:
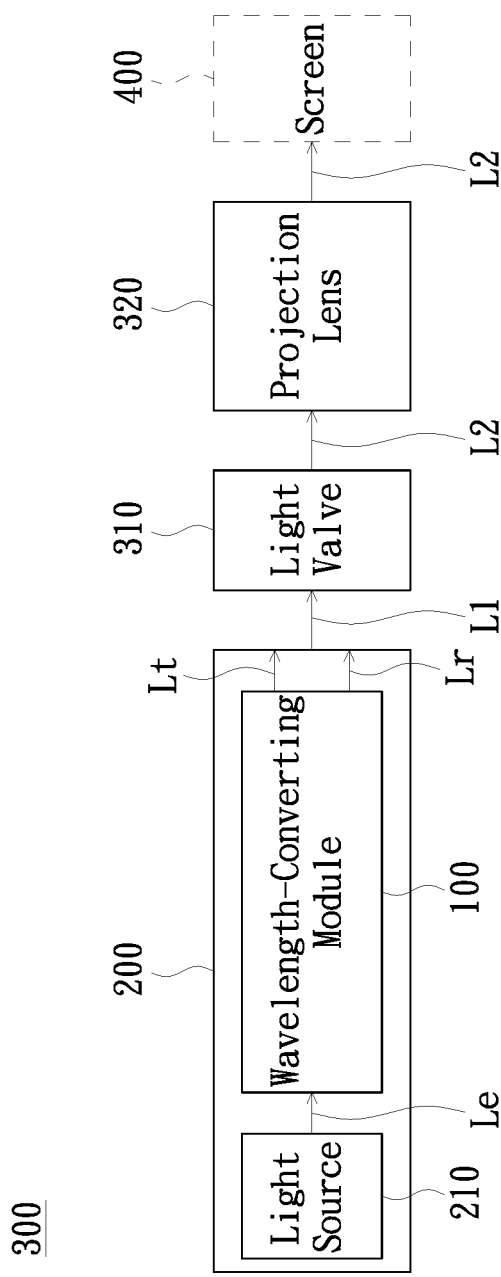
FIG. 8 is a schematic block diagram of a projection apparatus according to an embodiment of the invention.

FIG. 8 is a schematic block diagram of a projection apparatus according to an embodiment of the invention. Referring to FIGS. 1, 4, 5, 7, and 8, the projection apparatus of the embodiment includes the light source device 200 described above, a light valve 310, and a projection lens 320. The light source device 200 is configured to provide an illumination beam L1. The light valve 310 is disposed on a transmissive path of the illumination beam L1 to convert the illumination beam L1 into an image beam L2. The projection lens 320 is disposed on a transmissive path of the image beam L2 to project the image beam L2 onto a screen 400, so as to form an image on the screen 400. The wavelength-converting wheel 130 of the wavelength-converting module 100 can convert the excitation beam Le emitted from the light source 210 into a conversion beam Lt. The illumination beam L1 includes the conversion beam Lt. The light valve 310 may be a transmissive light valve or a reflective light valve. The transmissive light valve may be a transmissive liquid crystal panel, and the reflective light valve may be a digital micro-mirror device (DMD) or a liquid crystal on silicon (LCOS) panel, but the invention is not limited thereto. The projection lens 220 may include, for example, a combination of one or more optical lenses, and the one or more optical lenses may have a non-zero diopter. For example, a variety of combinations of non-planar lenses may be used, and the non-planar lenses include a biconcave lens, a biconvex lens, a concavo-convex lens, a convexo-concave lens, a plano-convex lens, and a plano-concave lens. In an embodiment, the projection lens 320 may also include a planar optical lens. The type and species of the projection lens 320 are not limited in the invention.

In addition, the wavelength-converting wheel 130 may have a wavelength-converting area (not depicted), a light transmission area (not depicted), and the like. When the wavelength-converting wheel 130 rotates, the wavelength-converting area and the light transmission area may cut into the transmission path of the excitation beam Le in turn. The wavelength-converting area includes phosphorescent materials such as fluorescent materials, phosphors, or wavelength conversion materials such as quantum dots. When the wavelength-converting area cut into the transmission path of the excitation beam Le, the excitation beam Le may radiate on the wavelength-converting area and be converted into the conversion beam Lt. When the light transmission area cut into the transmission path of the excitation beam Le, the excitation beam Le may penetrate through the light transmission area. The illumination beam L1 includes the conversion beam Lt and the excitation beam Le penetrating through the light transmission area (the excitation beam Le penetrating through the wavelength-converting 130 is indicated by Lr in the figure).

Based on the above, in the wavelength-converting module, the light source device, and the projection apparatus of the embodiments of the invention, the motor, the wavelength-converting wheel, and the light sensor are mounted to the carrying portion of the bracket, the bracket has the heat-dissipating fin set connected with the carrying portion, and the heat-dissipating fin set is exposed out of the casing via the opening portion, the heat generated by the motor while driving the wavelength-converting wheel to rotate, the heat generated while the excitation beam irradiates on the wavelength-converting wheel for wavelength conversion, and the heat generated while the light sensor is in operation can be directly conducted to the heat-dissipating fins via the carrying portion and dissipated by the air outside of the casing, so as to effectively reduce the temperature of the motor, the wavelength-converting wheel, the light sensor, and the bracket, and thereby achieving the effect of avoiding the thermal damage of the motor, the wavelength-converting wheel, the light sensor and maintaining normal operation of the light source device. In addition, since the heat dissipation of the motor, the wavelength-converting wheel, the light sensor, and so on may be achieved by heat-dissipating fins exposed out of the casing, the use of additional heat-dissipating elements may be omitted. The volume of the casing may be further reduced to facilitate the miniaturization of the light source device and the projection apparatus.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first heat-dissipating fin and the second heat-dissipating fin are only used for distinguishing various elements and do not limit the number of the elements.

What is claimed is:

1. A wavelength-converting module, comprising: a bracket, a motor, and a wavelength-converting wheel, wherein the bracket comprises a carrying portion and a heat-dissipating fin set, the heat-dissipating fin set is connected with the carrying portion, the motor is mounted to the carrying portion, and the wavelength-converting wheel is driven by the motor to rotate,
wherein the bracket further comprises a connecting portion and a plurality of locking holes, two opposite side faces of the connecting portion are connected with the carrying portion and the heat-dissipating fin set respectively, and the plurality of locking holes are formed on the connecting portion.

2. The wavelength-converting module according to claim 1, wherein the heat-dissipating fin set further comprises a plurality of heat-dissipating fins, the plurality of heat-dissipating fins are connected with the connecting portion, and each of the plurality of heat-dissipating fins extends toward a direction away from the connecting portion, at least one of the plurality of locking holes penetrates through one of the plurality of heat-dissipating fins along an extension direction of the one of the plurality of heat-dissipating fins.

3. A wavelength-converting module, comprising: a bracket, a motor, and a wavelength-converting wheel, wherein the bracket comprises a carrying portion and a heat-dissipating fin set, the heat-dissipating fin set is connected with the carrying portion, the motor is mounted to the carrying portion, and the wavelength-converting wheel is driven by the motor to rotate,
wherein the heat-dissipating fin set further comprises a plurality of heat-dissipating fins, the plurality of heat-dissipating fins are connected with the carrying portion, each of the plurality of heat-dissipating fins extends a direction away from the carrying portion, and a thickness of each of the plurality of heat-dissipating fins decreases from the carrying portion toward the direction away from the carrying portion.

4. The wavelength-converting module according to claim 1, wherein the wavelength-converting module further comprises a light sensor, the light sensor is disposed on the carrying portion.

5. The wavelength-converting module according to claim 1, wherein the bracket further comprises at least one heat-dissipating protruding rib, the at least one heat-dissipating protruding rib is disposed on the carrying portion.

6. A light source device, comprising a casing, a light source, and a wavelength-converting module, wherein the casing comprises an opening portion, the light source is disposed in the casing and is configured to provide an excitation beam, the wavelength-converting module is disposed at the opening portion, the wavelength-converting module comprises a bracket, a motor, and a wavelength-converting wheel, the bracket comprises a carrying portion and a heat-dissipating fin set, the carrying portion is disposed in the casing, and the heat-dissipating fin set is connected with the carrying portion and is exposed out of the casing via the opening portion, the motor is mounted to the carrying portion, the wavelength-converting wheel is driven by the motor to rotate, and the wavelength-converting wheel is disposed on a transmissive path of the excitation beam.

7. The light source device according to claim 6, wherein the bracket further comprises a connecting portion, two opposite side faces of the connecting portion are connected with the carrying portion and the heat-dissipating fin set respectively, the connecting portion abuts against the opening portion, and the light source device further comprises a filing element, the filing element is disposed in the casing and is positioned between the connecting portion and the opening portion.

8. The light source device according to claim 6, wherein the bracket further comprises a connecting portion and a plurality of locking holes, two opposite side faces of the connecting portion are connected with the carrying portion and the heat-dissipating fin set respectively, the plurality of locking holes are formed on the connecting portion, and the light source device further comprises a plurality of locking elements, the plurality of locking elements are mounted through the plurality of locking holes and the opening portion.

9. The light source device according to claim 8, wherein the heat-dissipating fin set further comprises a plurality of heat-dissipating fins, the plurality of heat-dissipating fins are connected with the connecting portion, and each of the plurality of heat-dissipating fins extends toward a direction away from the connecting portion, at least one of the plurality of locking holes penetrates through one of the plurality of heat-dissipating fins along an extension direction of the one of the plurality of heat-dissipating fins.

10. The light source device according to claim 8, wherein the heat-dissipating fin set further comprises a plurality of heat-dissipating fins, the plurality of heat-dissipating fins are connected with the connecting portion, and each of the plurality of heat-dissipating fins extends a direction away from the connecting portion, and a thickness of each of the heat-dissipating fins decreases from the carrying portion toward the direction away from the carrying portion.

11. A projection apparatus, comprising a light source device, a light valve, and a projection lens, wherein the light source device is configured to provide an illumination beam, the light valve is disposed on a transmissive path of the illumination beam to convert the illumination beam into an image beam, the projection lens is disposed on a transmissive path of the image beam, and wherein:

the light source device comprises a casing, a light source, and a wavelength-converting module, the casing has an opening portion, the light source is disposed in the casing and is configured to provide an excitation beam, the wavelength-converting module is disposed at the opening portion, the wavelength-converting module comprises a bracket, a motor, and a wavelength-converting wheel, the bracket comprises a carrying portion and a heat-dissipating fin set, the carrying portion is disposed in the casing, and the heat-dissipating fin set is connected with the carrying portion and is exposed out of the casing via the opening portion, the motor is mounted to the carrying portion, the wavelength-converting wheel driven is to rotate by the motor, and the wavelength-converting wheel disposed on a transmissive path of the excitation beam to convert the excitation beam into a conversion beam, the illumination beam comprises the conversion beam.

* * * * *